(12) United States Patent  (10) Patent No.: US 7,694,643 B1
Fan et al.                  (45) Date of Patent: Apr. 13, 2010

(54) SANDWICHED STRUCTURE FOR OPTICAL DISCS

(75) Inventors: Kai Leung Fan, Hong Kong (CN);
Ming Sang Yeung, Hong Kong (CN)

(73) Assignees: Dongguan Anwell Digital Machinery Co., Ltd. (CN); Anwell Precision Technology (HK) Limited (Hong Kong, HK)

( * ) Notice: Subject to any disclaimer, the term of this patent is extended or adjusted under 35 U.S.C. 154(b) by 374 days.

(21) Appl. No.: 11/231,671

(22) Filed: Sep. 21, 2005

Related U.S. Application Data (63) Continuation-in-part of application No. 11/182,687, filed on Jul. 15, 2005, now Pat. No. 7,276,119.

(51) Int. Cl.
B05C 11/02   (2006.01)
B05C 11/00   (2006.01)
B05C 13/02   (2006.01)
B05B 5/00    (2006.01)

(52) U.S. Cl. .................. 118/52; 118/63; 118/505; 118/641; 118/642; 118/667

(58) Field of Classification Search .............. 118/52, 118/641–643, 56–58, 319, 320, 300, 666, 118/667, 504–505; 264/1.33, 1.37; 427/240–241, 427/407.1, 425, 162, 282, 130; 428/64.1–64.6; 396/283; 425/810; 204/298.09, 298.12, 204/298.25
See application file for complete search history.

(56) References Cited

U.S. PATENT DOCUMENTS 4,033,288 A * 7/1977 Woellhaf et al. ............ 118/52

5,743,965 A * 4/1998 Nishimura et al. ............ 118/712

(Continued)

FOREIGN PATENT DOCUMENTS

JP       10289489 A  * 10/1998

(Continued)

OTHER PUBLICATIONS

English Translated Abstract 11-165114, Jun. 22, 1999.*

(Continued)

*Primary Examiner*—Yewebdar T Tadesse
(74) *Attorney, Agent, or Firm*—Wuxi Sino-US IP Agency, Ltd.; Joe Zheng (57) ABSTRACT

Sandwiched structures for an optical disc, especially for Blu-ray discs, are disclosed. According to one exemplary structure, a substrate is sandwiched by two cover layers on both sides of a disc As a result, similar characteristics in material on both sides of the disc help sustain the shape and flatness of the disc. To provide the cover layers in uniform thickness, techniques for creating or producing such a cover layer are described. In one embodiment, a certain amount of the material in liquid form is dispensed onto a dispensing structure. After the dispensing structure is engaged to hold a disc, the dispensing structure and the disc as a whole unit is rotated at a predefined speed. While the dispensed material on the dispensing structure is being dispersed evenly onto the surface of the disc as result of the centrifugal force, a heater is employed to retain or control the temperature of the dispensed material so that the flow of the dispensed material outwards can be effectively controlled to form a cover layer of uniform thickness on the disc.

26 Claims, 12 Drawing Sheets

U.S. PATENT DOCUMENTS

| | | | |
|---|---|---|---|
| 6,638,593 B2 * | 10/2003 | Selinfreund et al. | 428/64.1 |
| 6,821,459 B1 * | 11/2004 | Usami | 264/1.33 |
| 7,318,867 B1 * | 1/2008 | Fan et al. | 118/52 |
| 2003/0039797 A1 * | 2/2003 | Chang et al. | 428/66.6 |
| 2005/0287291 A1 * | 12/2005 | Kang et al. | 427/162 |
| 2005/0287331 A1 * | 12/2005 | Noguchi et al. | 428/64.4 |

FOREIGN PATENT DOCUMENTS

JP   11165114 A   *   6/1999

OTHER PUBLICATIONS

English Translated Abstract 10-289489, Oct. 27, 1998.*

* cited by examiner

Outline of Twin Cover Layer BD Read-Only disc

FIG. 7

SANDWICHED STRUCTURE FOR OPTICAL DISCS

CROSS-REFERENCE TO RELATED APPLICATION

This is a continuation-in-part of U.S. application Ser. No. 11/182,687, entitled "Method and apparatus for producing cover layers in Blu-ray discs", filed Jul. 15, 2005, now U.S. Pat. No. 7,276,119, and by at least one of the co-inventors herein.

BACKGROUND OF THE INVENTION

1. Field of the Invention

The invention is generally related to the area of optical information recording medium. More particularly, the present is related to new structures of Blu-ray discs.

2. The Background of Related Art

Blu-ray, also known as Blu-ray Disc (BD) is the name of a new-generation optical disc format jointly developed by the Blu-ray Disc Association (BDA), a group of leading consumer electronics and PC companies (including Apple, Dell, Hitachi, HP, JVC, LG, Mitsubishi, Panasonic, Pioneer, Philips, Samsung, Sharp, Sony, TDK and Thomson). The format was developed to enable recording, rewriting and playback of high-definition video (HD), as well as storing large amounts of data. A single-layer Blu-ray Disc can hold 25 GB, which can be used to record over 2 hours of HDTV or more than 13 hours of standard-definition TV. There are also dual-layer versions of the discs that can hold 50 GB.

While current optical disc technologies such as DVD, DVD±R, DVD±RW, and DVD-RAM use a red laser to read and write data, the new format uses a blue-violet laser instead, hence the name Blu-ray. Despite the different type of lasers used, Blu-ray products can easily be made backwards compatible through the use of a BD/DVD/CD compatible optical pickup and allow playback of CDs and DVDs. The benefit of using a blue-violet laser (405 nm) is that it has a shorter wavelength than a red laser (650 nm), which makes it possible to focus the laser spot with even greater precision. This allows data to be packed more tightly and stored in less space, so it's possible to fit more data on the disc even though it is the same size as a CD/DVD. This together with the change of numerical aperture to 0.85 is what enables Blu-ray Discs to hold 25 GB/50 GB.

Blu-ray discs can be read at a blue-violet laser ($\lambda$=405 nm) with a numerical aperture (NA) being 0.85. However, the increase of the NA value may effectively reduce the value of the thickness of the optical path that is denoted by t, defocus is proportional to $NA^2/\lambda$, the disc tilt tolerance is according to $\lambda/(t \times NA^3)$ and the thickness variation tolerance of the optical path is $\lambda/NA^4$. So it is generally concluded that the situation can be handled by controlling the error of that length and by decreasing the residual focus error. A simple calculation leads to the conclusion that around 0.1 mm thick of optical path and a few microns of error will guarantee compatible detection tolerances in the Blu-ray disc system to those in the conventional systems.

The cover layer formation is one of the characteristic processes in mass production of the Blu-ray discs. In general, a 0.1 mm-thick cover layer is placed on top of 1.1 mm-thick substrate. This appears one way that the physical specifications required by the format may be satisfied. However, the value of t is so small, the flatness requirement of the cover layer is of extremely high. Various manufacturing methods have been proposed how to generate a cover layer of 0.1 mm uniform thickness and place such a cover layer on a 1.1 mm-thick substrate.

One of the manufacturing methods to produce a cover layer is by spin coating of lacquer. Because of the inherent spinning characteristics in the manufacturing method, it is noted that it is very difficult to create a cover layer of 0.1 mm uniform thickness. To control the flow of the lacquer, an additional apparatus is provided to guide the flow of the lacquer. However, it is noted that, as the lacquer is spun outwards, the characteristics of the lacquer could cause that a certain level of jaggedness, likely the cover layer is thicker in the middle than in the edge area. In addition, the lacquer is typically cured by UV lighting. In the curing process, the lacquer in the edge are tends to shrink towards the middle. As a result, the thickness of the cover layer becomes non-uniform. Thus there has been a great need for techniques of providing uniform cover layer of a specified thickness onto a disc.

Figure 5:
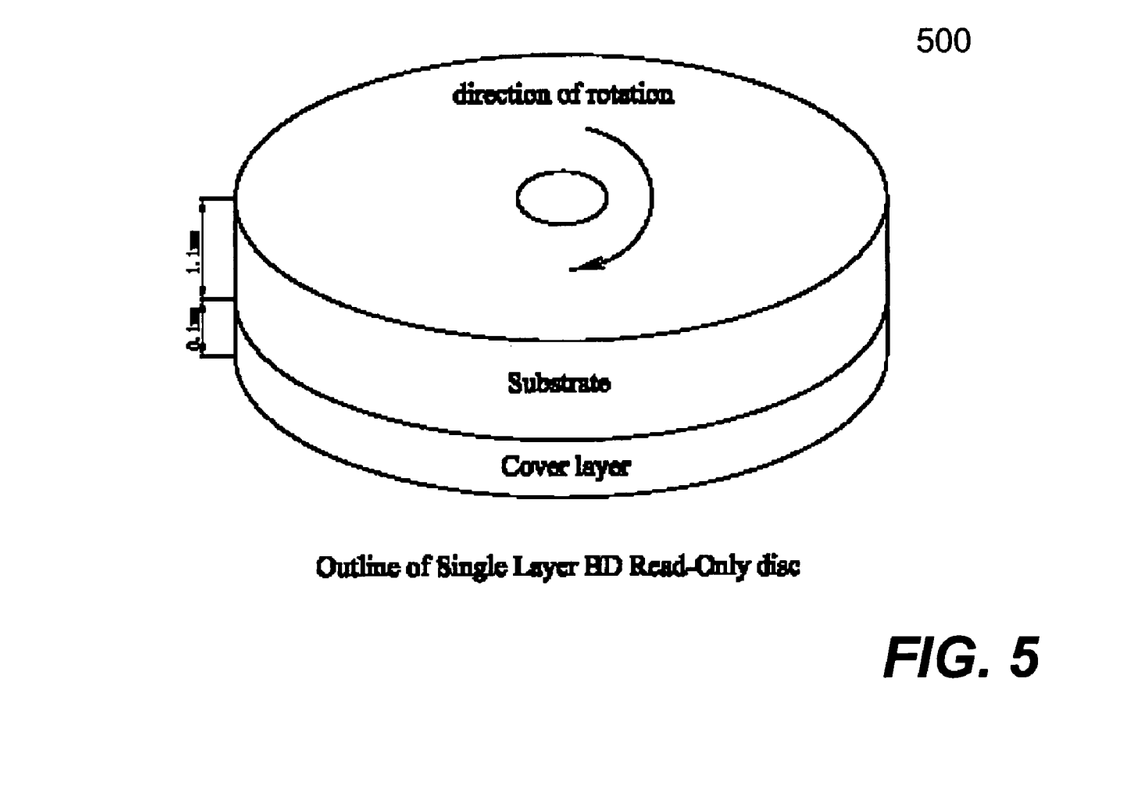
FIG. 5 shows a S+C structure that includes one substrate and one layer.

Essentially, the structure of a typical Blu-ray disc is a structure of 1.1 mm+0.1 m or S+C, where S stands for substrate and C stands for cover layer. FIG. 5 shows such S+C structure 500. As illustrated, one side of the disc is the substrate typically made from polycarbonate (PC) and the other side of the disc is a cover layer made from a UV curable material, hence S+C structure. The different materials on both sides of the disc present many different characteristics, such as moisture absorption, light resistance and heat resistance and expansion and contractibility. In particular, as far as the moisture absorption is concerned, polycarbonate is more prone to moisture absorption than the cover layer material does. As a result, the different characteristics in the materials on both sides of the disc may cause certain variations in the flatness of the disc. Thus there is a further need for a structure that prevents or minimizes different characteristics in the materials that contribute to the flatness of the disc.

SUMMARY OF THE INVENTION

This section is for the purpose of summarizing some aspects of the present invention and to briefly introduce some preferred embodiments. Simplifications or omissions in this section as well as in the abstract or the title of this description may be made to avoid obscuring the purpose of this section, the abstract and the title. Such simplifications or omissions are not intended to limit the scope of the present invention.

In general, the present invention pertains to techniques for providing a new structure for optical discs, especially for Blu-ray discs. According to one aspect of the present invention, a sandwiched structure for an optical disc includes three layers with two cover layers sandwiching a substrate layer. Because now the disc has both sides with substantially similar material and characteristics, the sandwiched structure helps greatly sustain the shape and flatness of the disc, subsequently increasing the readability of the disc.

According to another aspect of the present invention, a cover layer with uniform thickness is produced and layered respectively on both sides of an optical disc. The cover layer is formed with a type of material, such as glue, in hardened form. When laying a cover layer on one side of the disc, according to another aspect of the present invention, a certain amount of the material in liquid form is dispensed onto a dispensing structure. After the dispensing structure is engaged to hold the disc, the dispensing structure and the disc as a whole unit are rotated at a predefined speed. While the material dispensed on the dispensing structure is being dispersed evenly onto the surface of the disc as result of the centrifugal force, a heater is employed to retain or control the temperature of the dispensed material so that the flow of the dispensed material outwards can be effectively controlled to form a cover layer of uniform thickness on the disc. One of the key features in the present invention is that the material to form the cover layer is started from the dispensing structure that is so shaped that the material can be evenly dispersed onto the surface of the disc.

According to another aspect of the present invention, the heater operates to radiate infrared beams at one or more wavelengths suitable for being absorbed by the material. Depending on the characteristics of the material or glue, the heater is configured to radiate infrared beams in different magnitudes across the disc. As a result, a temperature for each of circular regions of the disc is controlled by the heater such that the material in each of the circular regions is kept in substantially similar temperature. According to still another aspect of the present invention, a curing process (e.g., using UV lighting) is started to cure the material near the outer area of the disc to prevent the dispersed material from shrinking towards the center of the disc.

According to yet another aspect of the present invention, air pipes are used to supply air to blow off residuals on the dispensing structure, wherein the air also acts as an air cushion for the dispensing structure when the dispensing structure is treated or gripped again. Depending on implementation or the characteristics, the dispensing structure may be shaped accordingly.

There are numerous functions, benefits and advantages in the present invention, one of them is that the present invention provides new structures for optical and techniques for providing cover layers in a disc, wherein each of the cover layers has a uniform thickness across the disc. The present invention may be implemented in numerous forms including software and hardware as method, process, or apparatus. According to one embodiment of the present invention, the present invention an optical disc that comprises two cover layers of an identical material; and a substrate sandwiched by the two cover layers. When used for Blu-ray discs, each of the cover layers is substantially close to 0.1 mm in thickness while the substrate is substantially close to 1.0 mm in thickness. The sandwiched structure of having two cover layers on both sides of the substrate help sustain help sustain desired shapes and flatness of the disc.

According to another embodiment of the present invention, the present invention is an apparatus for providing a cover layer in an optical disc, the apparatus comprises at least a molding machine producing substrates sequentially; and a cover layer station, eventually receiving the substrates, configured to provide one cover layer on both sides of each of the substrates such that the optical disc presents a structure of a substrate sandwiched by two cover layers on both side. The cover layer station includes at least one cover layer mechanism that includes an upper part including means for producing an electromagnetic field and a dispensing structure, the electromagnetic field, when produced, being strong enough to grip the dispensing structure and a lower part including a disc positioning structure, wherein, the upper part is caused to move towards the lower part so that the dispensing structure is released to engage the disc placed on the disc positioning structure, a certain amount of glue is then dispensed onto the dispensing structure, and wherein the lower part is caused to rotate at a predefined speed so that the glue is dispersed evenly onto a surface of the disc by a centrifugal force. In addition, a heater employed to control the temperature of the material so that the material is spread in a controlled manner onto the disc, and a UV lighting fixture provided to cure the glue near outer areas of the disc to prevent the glue from shrinking towards a center of the disc.

Other objects, features, and advantages of the present invention will become apparent upon examining the following detailed description of an embodiment thereof, taken in conjunction with the attached drawings.

BRIEF DESCRIPTION OF THE DRAWINGS

These and other features, aspects, and advantages of the present invention will become better understood with regard to the following description, appended claims, and accompanying drawings where:

FIG. 2A-FIG. 2H show respective aspects of the operation of the configuration in FIG. 1A according to one embodiment;

DETAILED DESCRIPTION OF THE PREFERRED EMBODIMENTS

The present invention pertains to new structures for optical discs and techniques for producing such discs. The new structures may be advantageously used for Blu-ray discs. According to one aspect of the present invention, a structure is disclosed to shows that a substrate is sandwiched by two cover layers on both sides of a disc As a result, similar characteristics in material on both sides of the disc help sustain the shape and flatness of the disc. To provide the cover layers in uniform thickness, a cover layer with uniform thickness is produced onto one side of an optical disc at a time. The cover layer is formed with a type of material, such as glue, in hardened form. According to another aspect of the present invention, a certain amount of the material in liquid form is dispensed onto a dispensing structure. After the dispensing structure is engaged to hold a disc, the dispensing structure and the disc as a whole unit to be rotated with a predefined speed. The dispensed material on the dispensing structure is dispersed evenly onto the surface of the disc as result of the centrifugal force. One of the key features in the present invention is that the material to form the cover layer is started from the dispensing structure that is so shaped that the material can be evenly dispersed onto the surface of the disc. According to still another aspect of the present invention, a curing process (e.g., using UV lighting) is started to cure the material on the edge of the disc to prevent the dispersed material from shrinking. Other aspects of the present invention may be appreciated in the following detailed description.

The detailed description of the present invention is presented largely in terms of procedures, steps, logic blocks, processing, or other symbolic representations that directly or indirectly resemble the operations of devices or systems that can be used on networks. These descriptions and representations are typically used by those skilled in the art to most effectively convey the substance of their work to others skilled in the art.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments. Further, the order of blocks in process flowcharts or diagrams or the use of sequence numbers representing one or more embodiments of the invention do not inherently indicate any particular order nor imply any limitations in the invention.

Figure 6:
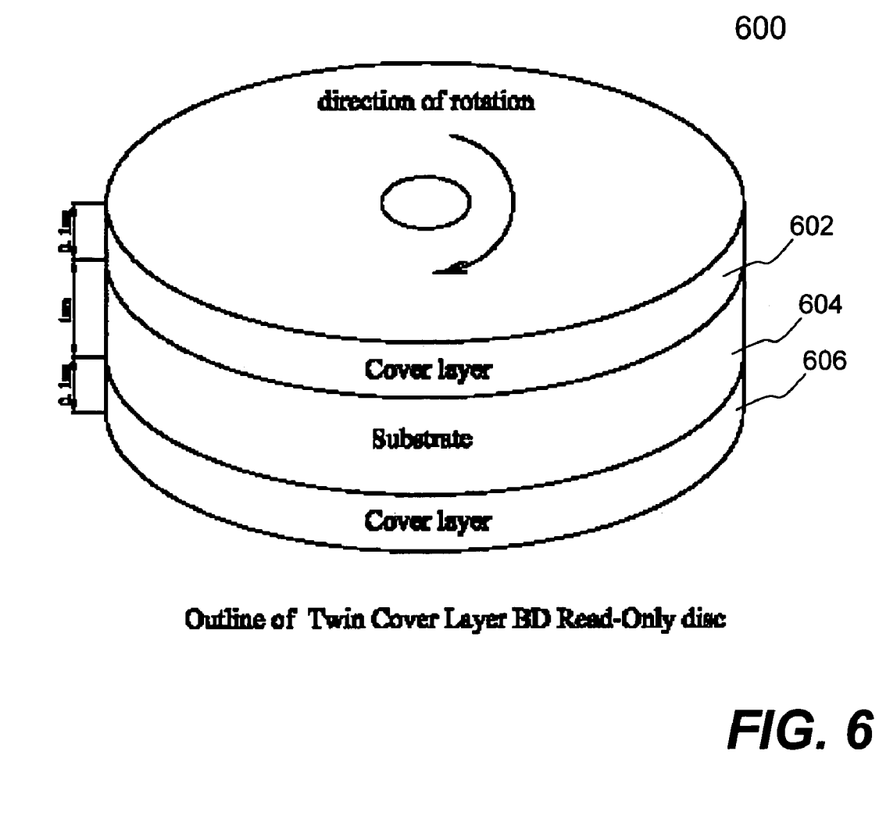
FIG. 6 shows a perspective view of a new structure that can be advantageously used for a Blu-ray disc.

Referring now to the drawings, in which like numerals refer to like parts throughout the several views. FIG. 6 shows a perspective view of a new structure 600 for a Blu-ray disc. The structure 600 shows a structure of C+S+C, where C stands for a cover layer and S stands for the substrate. Essentially, a disc now has two cover layers 602 and 606 on both sides of the disc. In other words, the substrate layer is sandwiched between two identical cover layers, thus referred to herein as C+S+C structure. According to one embodiment of the sandwich the substrate 604, the thickness of the cover layer is 0.1 mm while the thickness of the substrate is 1.0 mm. Alternatively, an optical disc (e.g., a Blu-ray disc) in accordance with the present invention is also referred to as 0.1 mm+1.0 mm+0.1 mm structure.

The C+S+C structure provides two cover layers on both sides of a disc that essentially prevent the disc from being deformed due to various ambient factors such as moisture or heat. Physically, because such a disc is symmetric with an identical material on both sides, the symmetric material helps considerably to sustain many characters (e.g., shape and flatness) of the disc.

Figure 7:
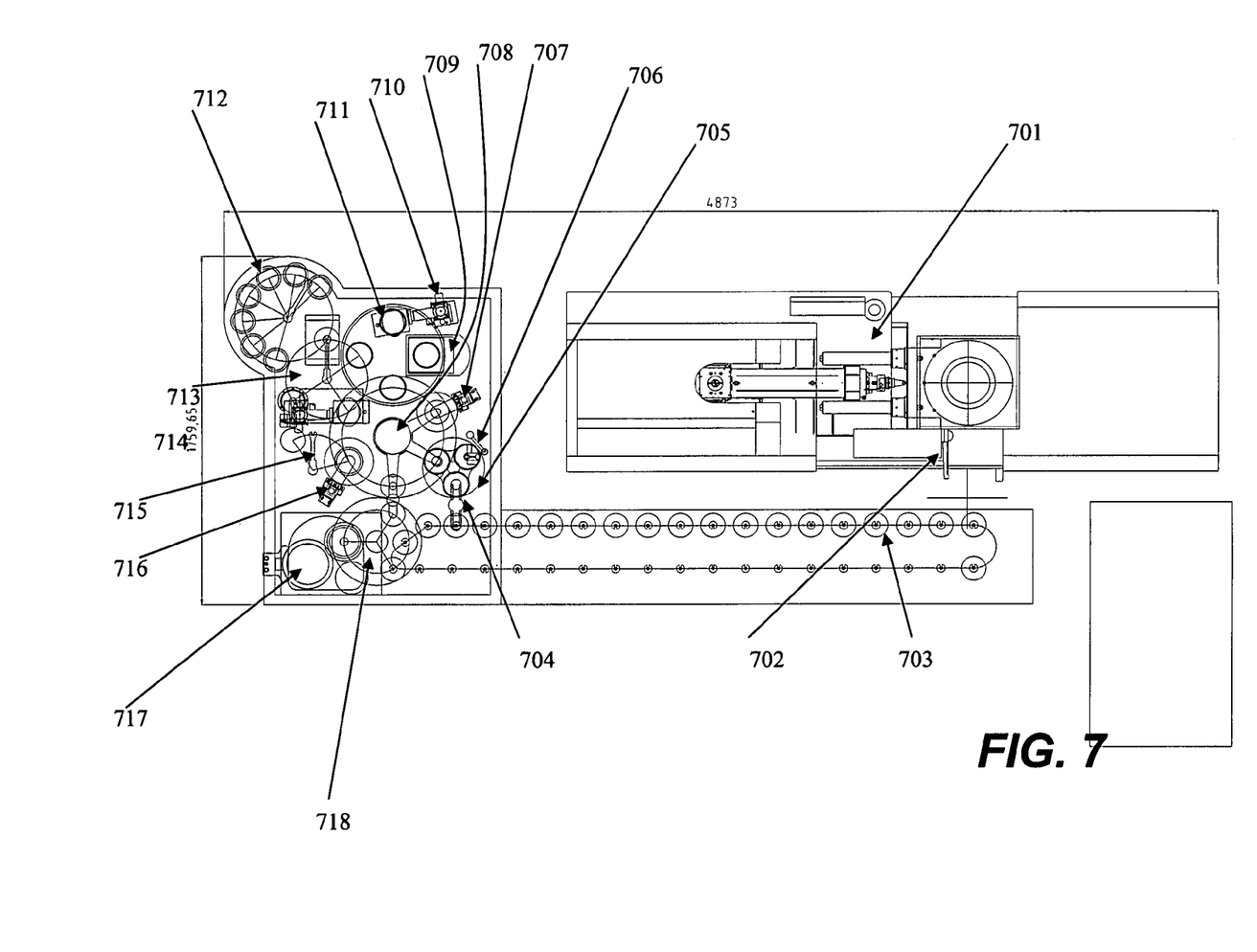
FIG. 7 shows a layout of a manufacturing process for Blu-ray discs in accordance with one embodiment of the present invention.

Referring now to FIG. 7, there shows a layout of a manufacturing process 700 for manufacturing Blu-ray discs in accordance with one embodiment of the present invention. As shown in FIG. 7, a molding machine 701 produces substrates or disks. The disks are based on polycarbonate (PC) material and each has a center opening (e.g., 15 mm in diameter). The disks are placed by a mechanic arm 702 onto a convey belt 703 that continuously transports the disks to a vacuum sputtering chamber 717 located at the other end of the convey belt 703. The convey belt 703 is made to be of a certain length. While the disks are being transported, the disks are quickly cooled down to a temperature (e.g., between 40~50 degrees) by cooling air projecting on both sides of the disks. At the end of the convey belt 703, the disks are loaded into vacuum sputtering chamber 717 where the disk is sputtered with a uniform layer of reflective material.

The sputtered disks are then sent to a cover layer station 708. Depending on implementation, the cover layer station 708 may have one or two independent cover layer mechanisms. In the case that there is only one cover layer mechanism, a cover layer is formed on one side of the disk at a time. In operation, after a disk is layered with one cover layer, the disk is turned over by a mechanic arm for a cover layer on the other side of the disk. FIG. 7 shows that there are two cover layer mechanisms 707 and 716. After a cover layer is formed on one side of the disk at the cover layer mechanisms 707, it is transported or turned over to the cover layer mechanisms 716 where a second cover layer is layered onto the other side of the disk. The finalized discs are inspected at an inspection station 713 that place qualified discs on designated spindles in a storage station 712. As shown in FIG. 7, there are seven (7) spindles. The qualified discs may be put on first five spindles and the disqualified discs may be put on last two spindles. Each spindle can be arranged to receive discs independently without affecting the operation of the entire system.

Figure 1:
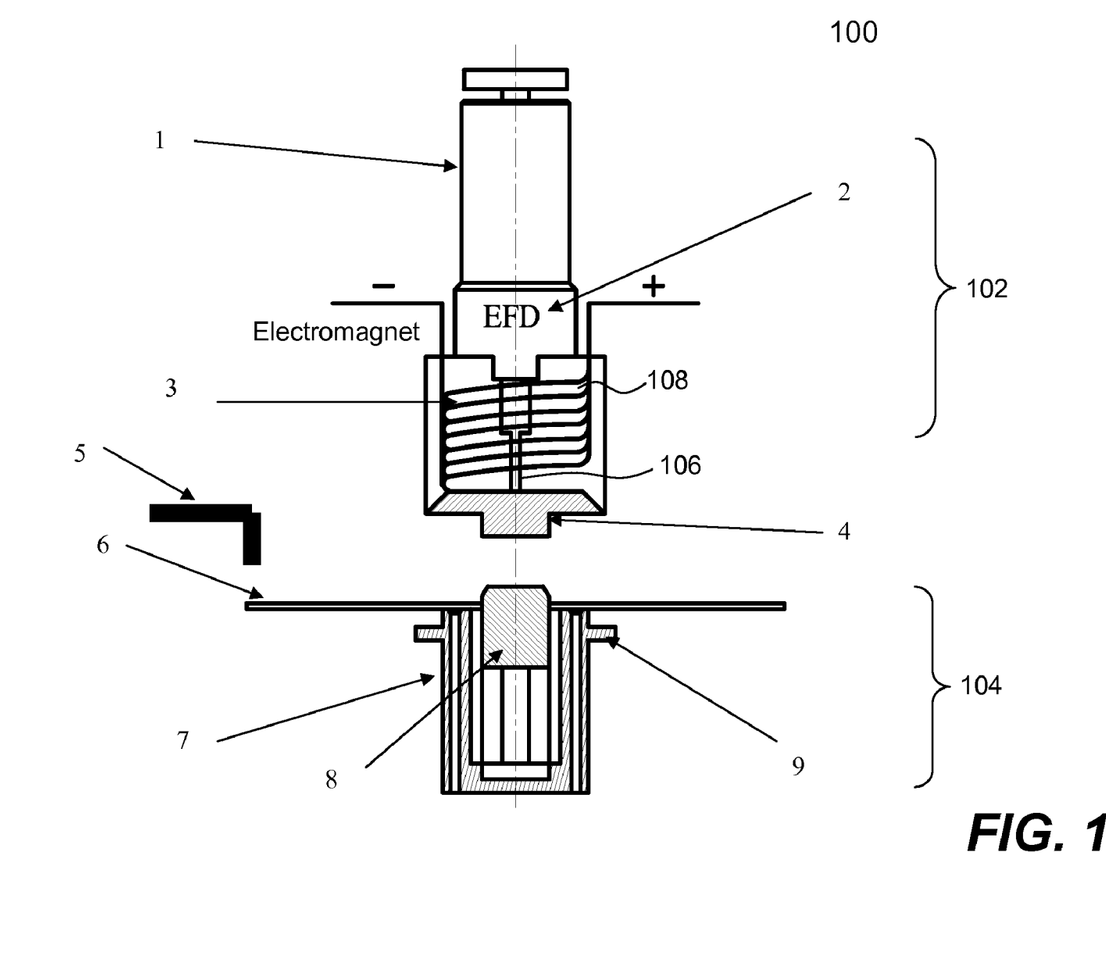
FIG. 1 shows a cross-section view of an exemplary apparatus or configuration in accordance with one embodiment of the present invention.

Referring now to FIG. 1, there shows a cross-section view of an exemplary apparatus or configuration 100 in accordance with one embodiment of the present invention to form or produce the cover layer. The configuration 100 may be advantageously used in a system to produce Blu-ray discs for carrying or storing digital information. The configuration 100 may correspond to one of the cover layer mechanism in FIG. 7.

One of the advantages, features and benefits of the configuration 100 is the underlying mechanism that produces a cover layer with uniform thickness (e.g., 0.1 mm). According to one embodiment, the material of the cover layer is based on a type of glue or a material that can be in liquid form under a certain condition, where the material, when hardened, is suitable for the blue laser. As used herein, a word "glue" means such a material that can be in liquid form under a certain condition and hardened under another condition.

As shown in FIG. 1, there are two mechanical parts, an upper part 102 and a bottom part 104. The upper part 102 includes a glue dispenser 1 containing a type of glue and a valve 2 to control the delivery of the glue, where the valve 2 is connected to a glue opening or nozzle 106. The upper part 102 further includes a glue dispending cap or structure 4 and means for controlling the glue dispending structure 4. In one embodiment, the means for controlling the glue dispending structure 4 is by an electromagnetic field to grip or release the glue dispending structure 4. It can be understood that by controlling the application of voltage or current, the electromagnetic field generated by the coil 108 can grip or release the glue dispending structure 4 in operation. The bottom part 104 includes a disc positioning structure 8 and magnetic means 9 (e.g., one or more permanent magnets). In one embodiment, a UV light structure 5 is positioned near the edge or outer areas of a disc 6, where the disc 6 is on the disc positioning structure 8 being spun at a predefined speed.

Figure 2A:
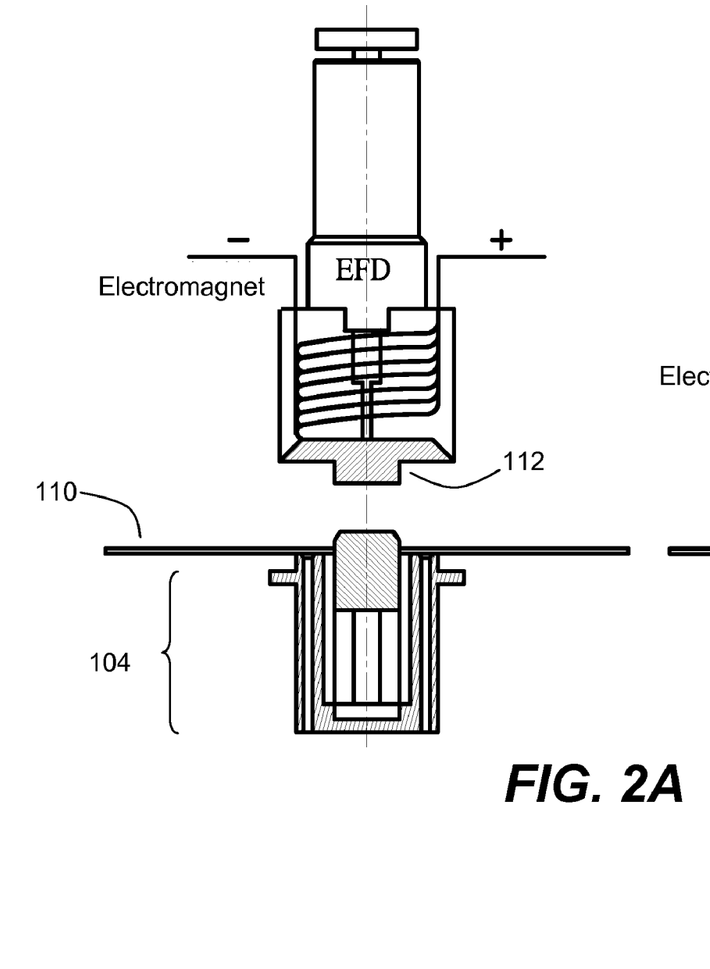
Figure 2B:
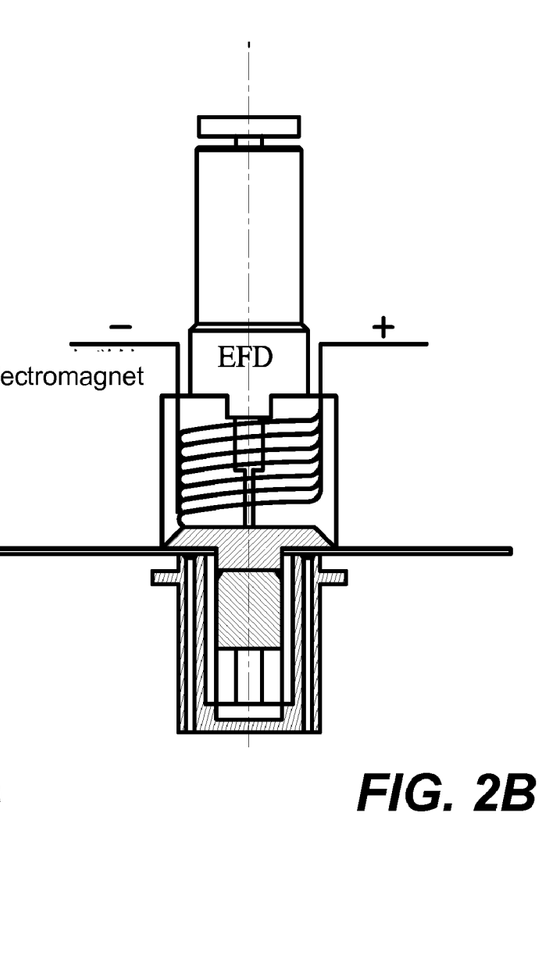
Figure 2C:
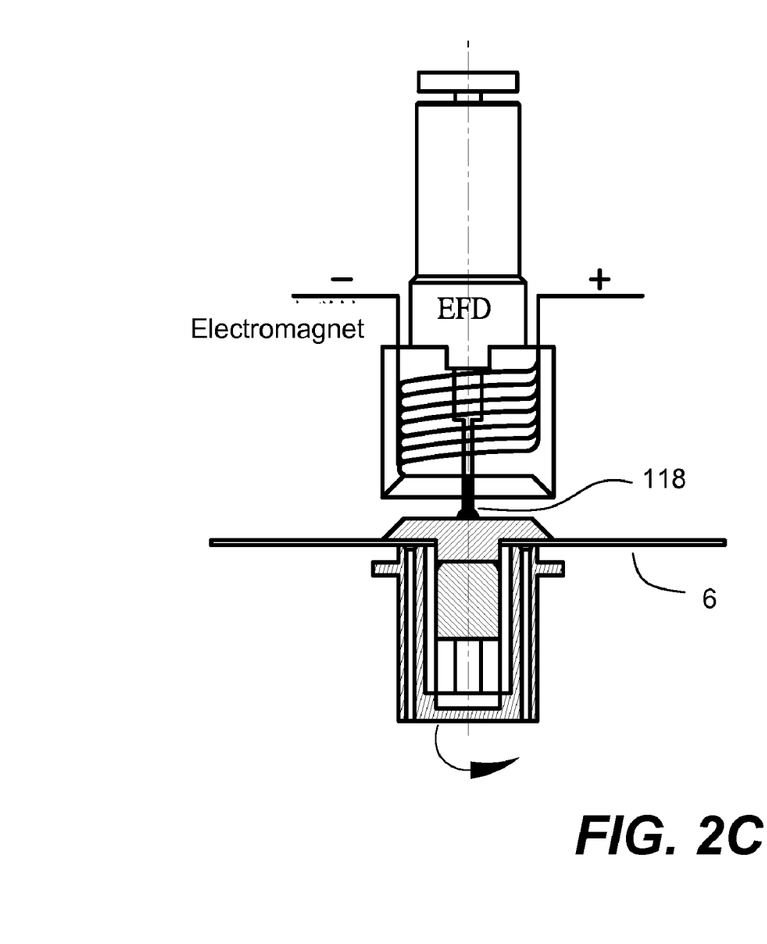

Referring now to FIG. 2A-FIG. 2H, there show respective aspects of the operation of the configuration 100 according to one embodiment. FIG. 2A shows that a disk, a sputtered disk or a disc 110 is loaded or placed onto the bottom part 104. After the disc 104 is positioned on the disc positioning structure 8, the glue dispensing structure 4 being gripped by the electromagnetic field is to be engaged with the disc 100. The upper part 102 and bottom part 104 go towards each other, relatively. In one embodiment, the upper part 102 comes downwards. The extended part 112 of the glue dispensing structure 4 pushes the disc positioning structure 8 downwards as shown in FIG. 2B. At same time, the electromagnetic field that grips the glue dispensing structure 4 is ceased so as to release the glue dispensing structure 4 to engage the disc 6 as shown in FIG. 2C.

Figure 2D:
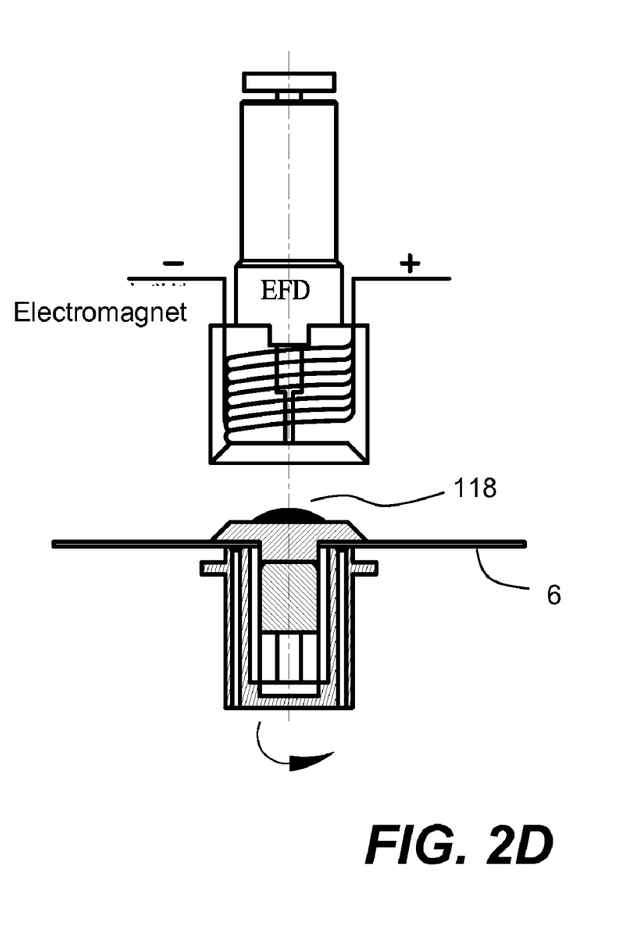
Figure 2E:
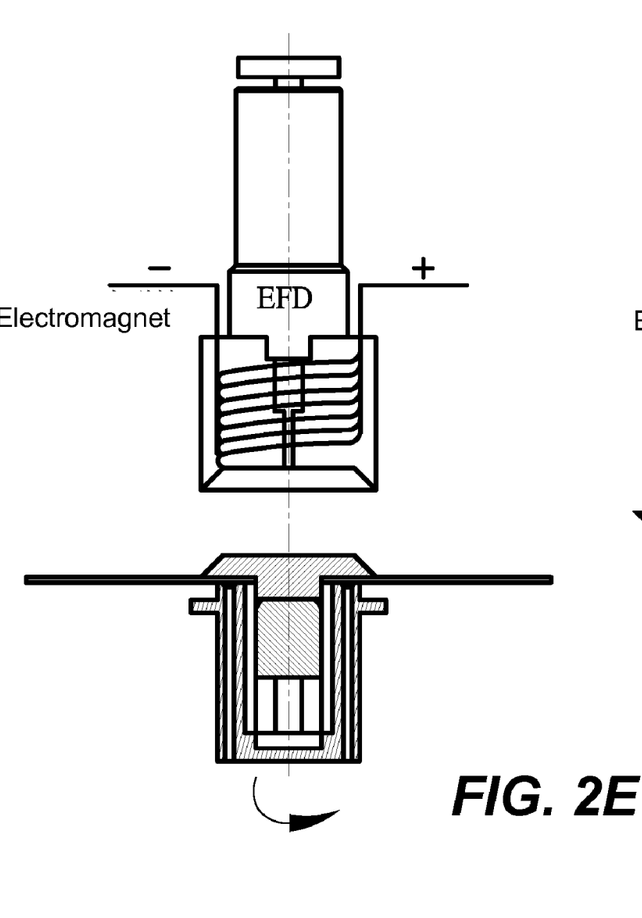

At this moment, the disc is firmly engaged by the glue dispending structure 4. The glue nozzle 106 releases or dispenses a certain amount of glue onto the glue dispending structure 4. FIG. 2D shows that a certain amount of glue 118 has been dispensed on the glue dispending structure 4. Now the bottom part 104 spins or is caused to rotate, thus causing the glue 118 on the glue dispending structure 4 to disperse onto the surface of the disc 6 by a centrifugal force. In one embodiment, depending on the characteristics of the glue, the rotating speed of the bottom part 104 can be controlled so that a predefined thickness (e.g., 0.1 mm) of the glue is evenly dispersed. FIG. 2E shows that the dispended glue on the glue dispending structure 4 has been dispersed on the disc.

Figure 2F:
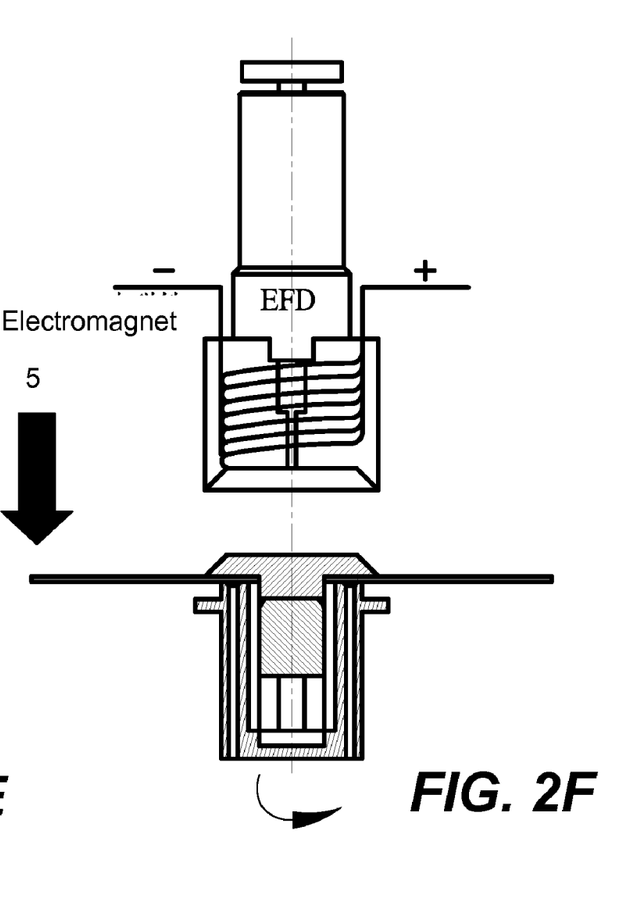
Figure 2G:
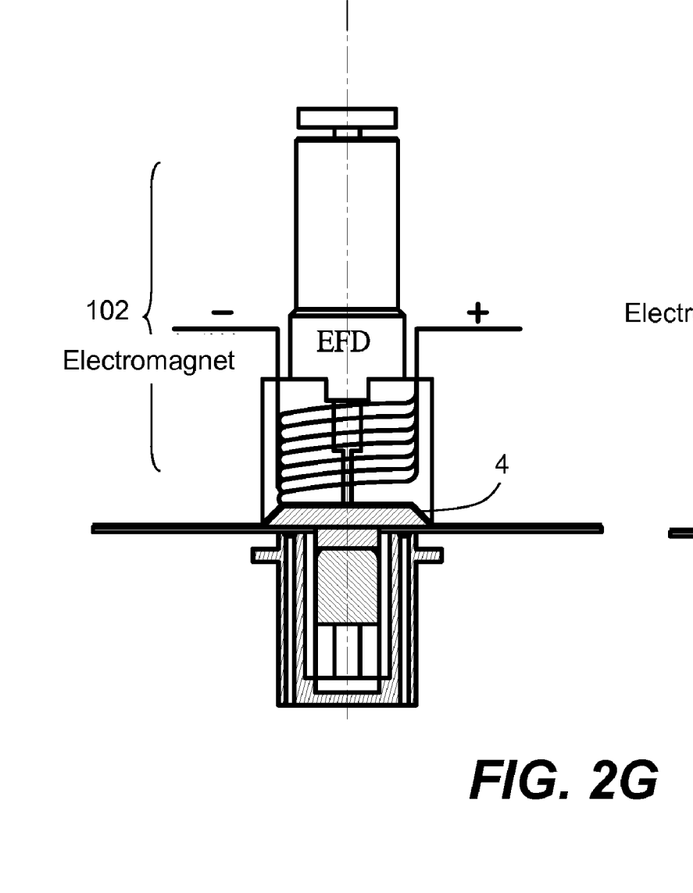
Figure 2H:
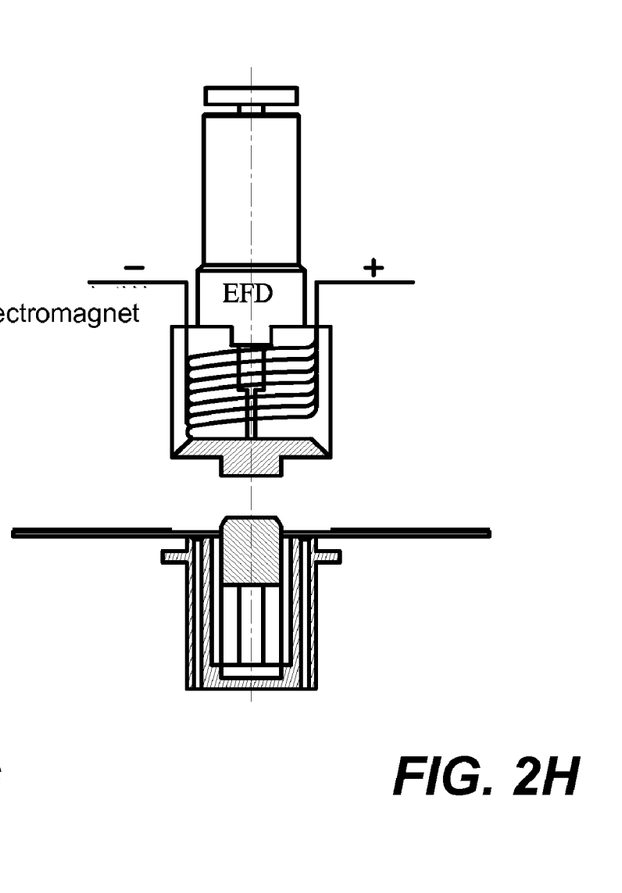
Figure 2I:
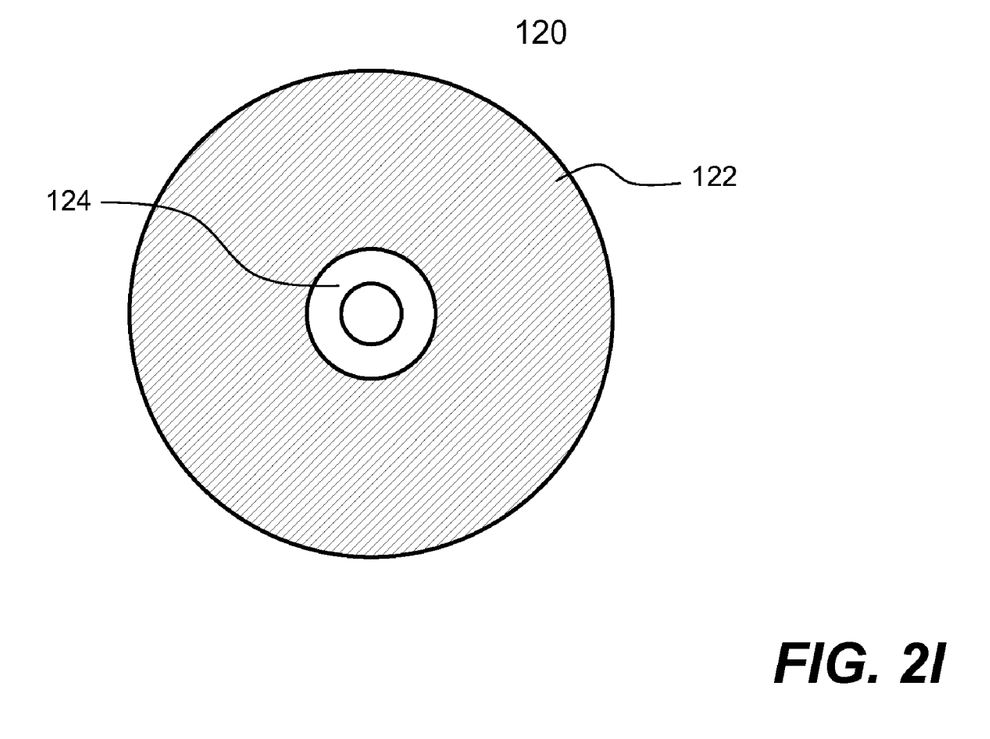
FIG. 2I illustrates an exemplary disc with a cover layer produced in accordance with the operations of FIG. 2A-FIG. 2H.

To prevent the glue on the edge area from shrinking towards the middle of the disc, the UV light structure 5 is positioned around the edge portion of the disc, as shown in FIG. 2F, to cure the glue while the bottom part 104 is still spinning. In one embodiment, the UV light structure 5 is positioned about 55-60 mm from the center of the disc. FIG. 2G shows that the upper part 102 comes down to pick up the glue dispensing structure 4 by the electromagnetic field. FIG. 2H shows that the glue dispensing structure 4 has been gripped back to the upper part 102. Essentially a cycle of providing a cover layer onto a disc is complete. As a result, a disc 120 with a cover layer 122 is produced as shown in FIG. 2I. It should be noted the disc 120 does not have the cover layer 122 across the entire surface. The center portion 124 which is not the data area is not covered by the cover layer 122. The center portion 124 was covered by the glue dispending structure 4 when the cover layer 122 was formed and therefore prevented from being dispersed with a layer of glue.

Figure 2J:
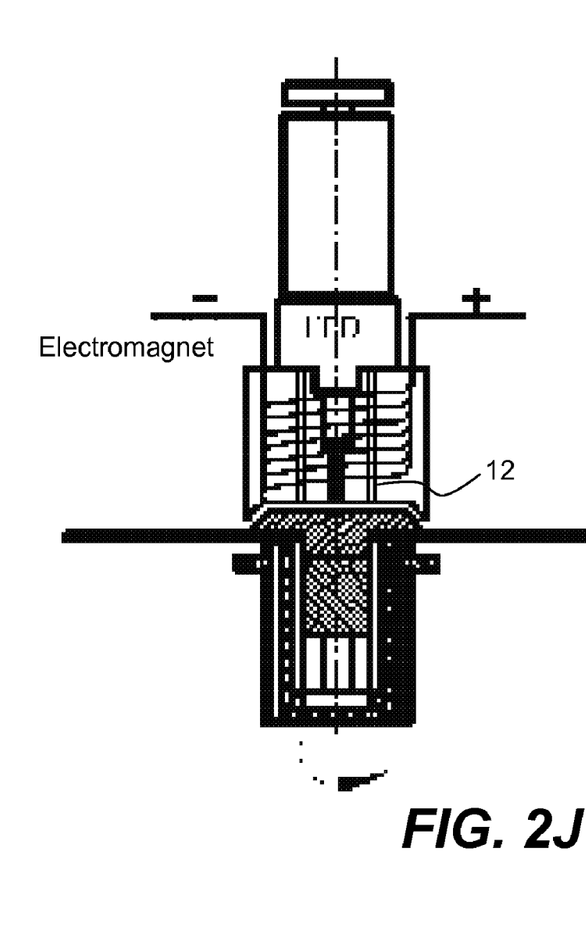
FIG. 2J shows that air pipes are used to project the air onto the glue dispending structure.
Figure 2K:
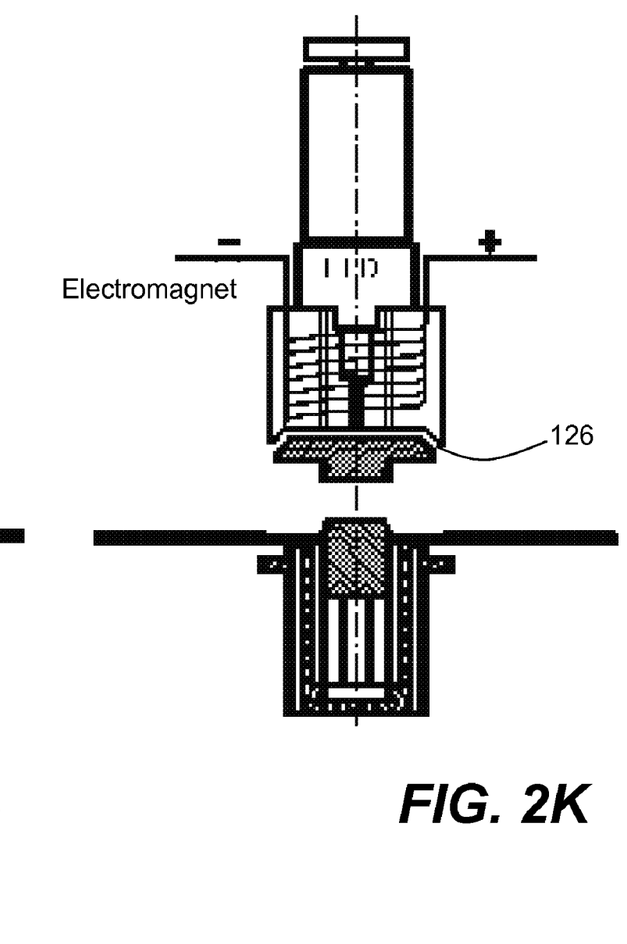
FIG. 2K shows that the air from the air pipes provides an air buffer to avoid the contact of the glue dispending structure with an upper part designed to grip and release the glue dispending structure.

In operation, to minimize glue residual on the glue dispending structure 4, in one embodiment, a certain amount of air is injected onto the glue dispending structure 4. The glue residual, if any, may be blew off the glue dispending structure 4. On the other end, the air acts as an air buffer or cushion between the glue dispending structure 4 and the upper part 102. FIG. 2J shows that there are air pipes 12 injecting the air onto the glue dispending structure 4. FIG. 2K shows that the air from the air pipes 12 provides an air buffer 126 to avoid the contact of the glue dispending structure 4 with the upper part 102.

Figure 3A:
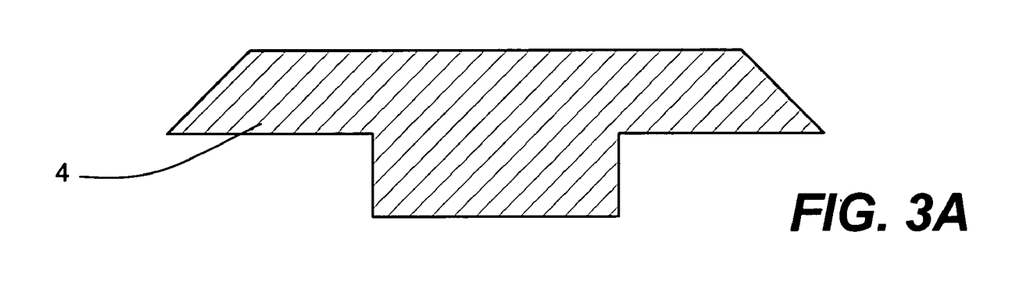
FIG. 3A shows an enlarged view of the glue dispending structure used in FIG. 2A-FIG. 2K.
Figure 3B:
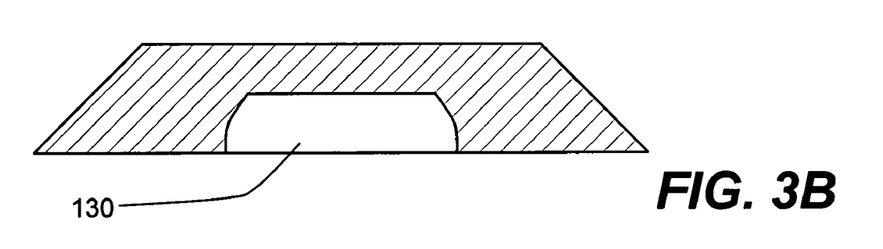
FIG. 3B shows a second embodiment of the glue dispending structure.
Figure 3C:
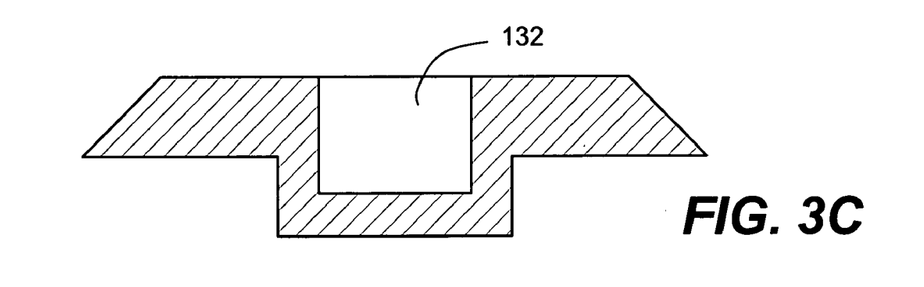
FIG. 3C shows a modified glue dispending structure in which a reservoir is provide to supply an additional amount of glue to ensure that there is always sufficient glue to be dispersed evenly onto a disc in accordance with a thickness requirement.

FIG. 3A shows an enlarged view of the glue dispensing structure 4 that is used in FIG. 2A-FIG. 2K. FIG. 3B shows a second embodiment of the glue dispensing structure that may be also be used. The shape of the hollow space 130 in the glue dispensing structure matches that of the disc positioning structure 8. FIG. 3C shows a modified glue dispensing structure 10 in which a reservoir 132 is provide to reserve an additional amount of glue to ensure that there is sufficient glue to be dispersed evenly onto a disc in accordance with a thickness requirement.

Figure 4A:
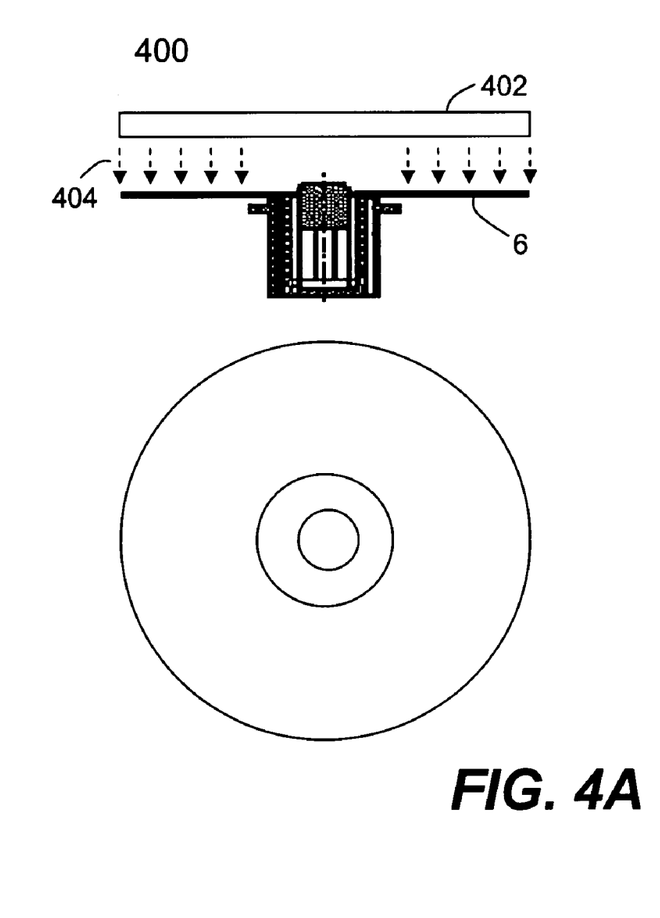
FIG. 4A shows an embodiment including a heater to retain or control the temperature of a type of material or glue used to form a cover layer.

Referring now to FIG. 4A, there shows an embodiment 400 including a heater 402. The embodiment may be understood in conjunction with FIG. 2A-FIG. 2H. The heater 402 is positioned near the disc 6 and operates to control the flow of the glue outwards, when the disc 6 is caused to spin so as to dispense the glue on the glue dispensing structure 4 outwards onto the surface of the disc 6. As the glue is moving towards outside, the temperature of the glue may drop rapidly because of the thermal exchange with the air. As a result, the glue may become sticky and be hard to form a cover layer of uniform thickness on the disc 6. By using the heater 402, the desired temperature of the glue can be controlled or retained.

Figure 4B:
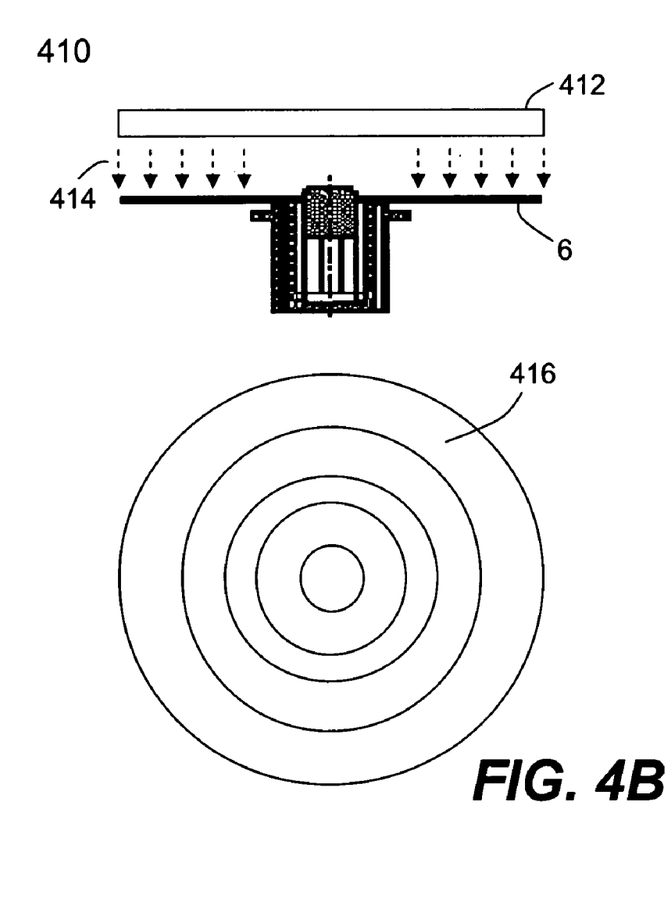
FIG. 4B shows an embodiment in which a heater is configured to radiate infrared beams in different magnitude across a disc so that when the glue is spread across circular regions on a disc, the glue can be kept in different temperatures.

According to one embodiment, the heater 402 is an infrared heater that can be adjusted to radiate infrared beams 404 at one or more wavelengths suitable for being absorbed by the material of the glue. Although the temperature of the glue may drop rapidly when the glue is spun outwards, the temperature of the glue can now be held up by the heater 402 to avoid the glue being sticky. According to another embodiment 410 as shown in FIG. 4B, the heater 412 is configured to control different temperatures across the disc 6. Depending on the characteristics of the glue, the temperature of the glue in the circular regions as shown as 416. The glue in each of the circular regions is kept substantially similar temperature. In operation, the heater 412 radiates infrared beams 414 in different magnitudes respectively corresponding to the circular regions of the disc 6. As a result, the flow of the glue outwards by spinning can be better controlled and subsequently to form a cover layer of uniform thickness on the disc 6.

The present invention has been described in sufficient details with a certain degree of particularity. It is understood to those skilled in the art that the present disclosure of embodiments has been made by way of examples only and that numerous changes in the arrangement and combination of parts may be resorted without departing from the spirit and scope of the invention as claimed. Accordingly, the scope of the present invention is defined by the appended claims rather than the foregoing description of embodiments.

We claim:

1. A system for providing an optical disc, the system comprising:
    at least a molding machine producing substrates sequentially;
    a vacuum sputtering chamber;
    a cooling means to cool down the substrates to a desired temperature while the substrates are being transported to the vacuum sputtering chamber, wherein the substrates are sequentially sputtered with a type of reflective material; and
    a cover layer station including a first cover layer mechanism and a second cover layer mechanism and receiving the sputtered substrates, wherein the first cover layer mechanism is configured to provide one cover layer on a first side of each of the substrates and the second cover layer mechanism is configured to provide another cover layer on a second side of each of the substrates such that the optical disc presents a structure of a substrate sandwiched by two cover layers on both sides of the substrates, each of the first and second cover layer mechanisms includes:
        an upper part including a dispensing structure;
        a lower part including a disc positioning structure, wherein, when the upper part and the lower part are caused to move towards each other, the dispensing structure is released to engage the substrate placed on the disc positioning structure, a certain amount of a type of material in liquid form and at a predefined temperature is dispensed onto the dispensing structure, wherein the substrate is caused to rotate at a predefined speed so that the material is dispersed evenly onto a surface of the substrate by a centrifugal force;

air pipes to inject to a certain amount of air onto the dispensing structure to blow off liquid residual on the dispensing structure; and a heater radiating infrared beams in different magnitudes to control temperature of the material so that the cover layer of uniform thickness is formed on top of the substrate.

2. The system as recited in claim 1, wherein the air pipes are included in the upper part.

3. The system as recited in claim 2, wherein the upper part further includes means for producing an electromagnetic field that, when produced, is strong enough to grip the dispensing structure.

4. The system as recited in claim 3, wherein the lower part includes a magnetic means.

5. The system as recited in claim 4, wherein the electromagnetic field has a more powerful force to retreat the dispensing structure than a force the magnetic means has to hold the dispensing structure.

6. The system as recited in claim 3, wherein the electromagnetic field is turned off to release the dispensing structure when the substrate placed on the disc positioning structure needs to be engaged by the dispensing structure.

7. The system as recited in claim 6, wherein the material is dispensed from a nozzle in the upper part onto the dispensing structure.

8. The system as recited in claim 7, wherein the electromagnetic field is turned on to grip the dispensing structure from the substrate.

9. The system as recited in claim 3, wherein the upper part includes said air pipes to inject air to blow off liquid residuals on the dispensing structure.

10. The system as recited in claim 9, wherein the injected air acts as an air buffer between the dispensing structure and a contact of the upper part.

11. The system as recited in claim 9, wherein the dispensing structure is gripped by the electromagnetic field to the upper part with an air cushion in between.

12. The system as recited in claim 1, wherein the upper part is caused to move towards the lower part or the lower part is caused to move towards the upper part.

13. The system as recited in claim 1, wherein the heater radiates infrared beams at one or more wavelengths suitable for being absorbed by the material.

14. The system as recited in claim 13, wherein the temperature of the material is controlled by the heater to prevent the material in liquid form from being sticky as the material is being dispensed outwards from the dispensing structure onto a surface of the substrate.

15. The system as recited in claim 13, wherein the heater is configured to radiate infrared beams in different magnitudes across the substrate.

16. The system as recited in claim 13, wherein a temperature for each of circular regions of the substrate is controlled by the heater such that the material in each of the circular regions is kept in substantially similar temperature.

17. The system as recited in claim 1, further including means for hardening the material dispersed on the surface of the substrate.

18. A system for providing a cover layer in an optical disc, the system comprising:
at least a molding machine producing substrates sequentially; and
a cover layer station, eventually receiving the substrates, including a first cover layer mechanism and a second cover layer mechanism, wherein the first cover layer mechanism is configured to provide one cover layer on a first side of each of the substrates and the second cover layer mechanism is configured to provide another cover layer on a second side of each of the substrates such that the optical disc presents a structure of a substrate sandwiched by two cover layers on both sides of the substrate, wherein the two cover layers have substantially similar material and characteristics, the two covers sandwiching the substrate help greatly sustain a shape and flatness of the disc, subsequently increasing readability of the disc, and each of the first and second cover layer mechanisms includes:
an upper part including means for producing an electromagnetic field and a dispensing structure, the electromagnetic field, when produced, being strong enough to grip the dispensing structure;
a lower part including a disc positioning structure,
wherein, the upper part is caused to move towards the lower part so that the dispensing structure is released to engage the substrate placed on the disc positioning structure, a certain amount of glue is then dispensed onto the dispensing structure, and
wherein the lower part is caused to rotate at a predefined speed so that the glue is dispersed evenly onto a surface of the substrate by a centrifugal force;
air pipes to insect to a certain amount of air onto the dispensing structure to blow off glue residual on the dispensing structure;
a heater radiating infrared beams in different magnitudes to control temperature of the material so that the material is spread in a controlled manner onto the substrate; and
a UV lighting fixture provided to cure the glue near outer areas of the substrate to prevent the glue from shrinking towards a center of the substrate.

19. The system as recited in claim 18, wherein the glue is dispensed from a nozzle in the upper part onto the dispensing structure.

20. The system as recited in claim 19, wherein the upper part includes said air pipes to inject air to blow off residuals of the glue on the dispensing structure.

21. The system as recited in claim 20, wherein the dispensing structure is gripped by the electromagnetic field to the upper part with an air cushion in between.

22. The system as recited in claim 18, wherein the dispensing structure includes a reservoir to ensure that there is a sufficient amount of the glue to be dispersed onto the surface of the substrate.

23. The system as recited in claim 18, wherein the heater radiates infrared beams at one or more wavelengths suitable for being absorbed by the material.

24. The system as recited in claim 23, wherein the temperature of the material is controlled by the heater to prevent the material in liquid form from being sticky as the material is being dispensed outwards from the dispensing structure onto a surface of the substrate.

25. The system as recited in claim 18, wherein the heater is configured to radiate infrared beams in different magnitudes across the substrate.

26. The system as recited in claim 25, wherein a temperature for each of circular regions of the substrate is controlled by the heater such that the material each in the circular regions is kept in substantially similar temperature.

* * * * *